United States Patent [19]

Vinther et al.

[11] Patent Number: 4,765,841
[45] Date of Patent: Aug. 23, 1988

[54] PROCESS FOR THE PREPARATION OF AN ORGANIC PIGMENT DISPERSION

[75] Inventors: Arne Vinther, Køge; Steffen C. Olsen, Farum; Bjørn E. H. Larsen, Køge; Elun S. Madsen, Allerød; Bjørn Madsen, Helsingør, all of Denmark

[73] Assignee: Kemisk Vaerk Koge A/S, Køge, Denmark

[21] Appl. No.: 917,155

[22] Filed: Oct. 9, 1986

[30] Foreign Application Priority Data

Oct. 11, 1985 [DK] Denmark .............................. 4672/85

[51] Int. Cl.⁴ .............................................. C04B 14/00
[52] U.S. Cl. ..................................... 106/402; 106/413; 106/493; 106/496; 106/499; 106/500; 106/504; 106/505
[58] Field of Search ........................... 106/309, 288 Q

[56] References Cited

U.S. PATENT DOCUMENTS

| | | | |
|---|---|---|---|
| 2,822,283 | 2/1958 | Blaser et al. | 106/262 |
| 3,728,143 | 4/1973 | Pollard | 106/309 |
| 3,980,488 | 9/1976 | Barrington et al. | 106/309 |
| 4,300,954 | 11/1981 | de Monterey et al. | 106/309 |
| 4,309,320 | 1/1982 | Arora et al. | 106/309 |
| 4,340,341 | 7/1982 | Arora et al. | 106/262 |
| 4,340,431 | 7/1982 | Arora et al. | 106/262 |

FOREIGN PATENT DOCUMENTS 2360093 6/1975 Fed. Rep. of Germany.
3121765 12/1982 Fed. Rep. of Germany.
2302328 2/1980 France.

OTHER PUBLICATIONS

Chemical Abstract No. 107, 192a, JP 50-157 418, vol. 84, 1976.

Primary Examiner—A. Lionel Clingman
Assistant Examiner—Willie J. Thompson
Attorney, Agent, or Firm—Birch, Stewart, Kolasch & Birch

[57] ABSTRACT

An organic pigment dispersion in a non-aqueous medium is prepared directly from an aqueous slurry containing 0.1–20% by weight of the pigment by mixing the aqueous slurry with the non-aqueous medium under vigorous agitation and subsequently isolating the organic pigment dispersion from the residual aqueous phase.

A substantial part of water in the resulting pigment dispersion can be removed by passing the organic pigment dispersion in the non-aqueous medium over a series of surfaces, the surface material thereof having different affinity for water and the non-aqueous medium, respectively, and then removing water and pigment dispersion in the non-aqueous medium, respectively, from respective surfaces.

23 Claims, 1 Drawing Sheet

U.S. Patent  Aug. 23, 1988  4,765,841
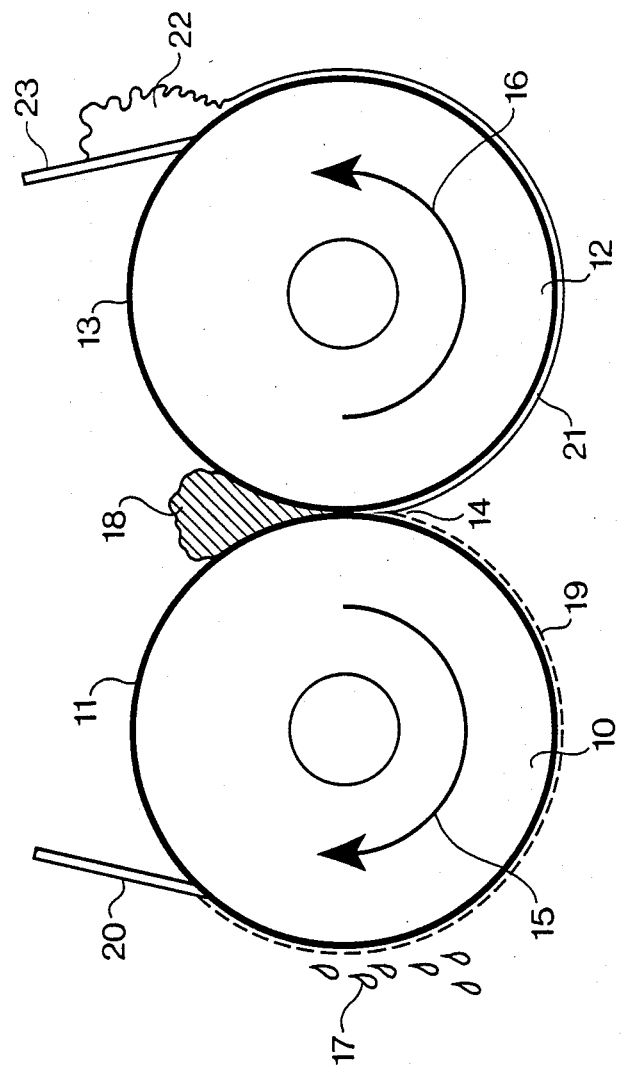

PROCESS FOR THE PREPARATION OF AN ORGANIC PIGMENT DISPERSION

BRIEF DESCRIPTION OF THE INVENTION

The present invention relates to a process for the preparation of an organic pigment dispersion in a non-aqueous medium. The process of the invention may be carried out directly on an aqueous slurry in which the organic pigment is formed; said slurry containing 0.1 to 20% by weight of the pigment calculated on the slurry is mixed with the non-aqueous medium under vigorous agitation and in the presence of a dispersing agent, and thereafter the organic pigment dispersion is isolated from the residual aqueous phase.

The organic pigment dispersion prepared according to the invention is to be used in the preparation of pigment pastes for the ink and paint utilizing industries.

DESCRIPTION OF THE TECHNICAL BACKGROUND

The transfer of a slurried solid from a first liquid phase into a second liquid phase, said first and second liquid phases being immiscible, and the solid being insoluble in both of the liquid phases, is a well known technique called "flushing".

In the present specification, the term "pigment" designates the pigment per se plus an optional content of resins added during or after the chemical synthesis of the pigment. Especially in the case of yellow and red pigments, resins are added. The character and nature of the resins are explained in detail herinafter.

It is known to flush pigments from a press-cake in which the pigment constitutes about 20-50% into a non-aqueous phase. The flushing may be performed by mixing the two liquid phases (containing the solid), e.g. by means of a dough mixer, a high-speed stirrer, a static mixer, etc. The resulting slurry of pigments in the non-aqueous phase normally comprises 20-40% of pigment. The advantages of flushed pigments are mainly based on the fact that the fine structure of the pigments is retained in the flushed form.

The initial steps for manufacturing either dry or flushed pigment colours are identical. Chemical intermediates are reacted together to form the pigment, which is in most cases isolated as an aqueous suspension (the slurry) and filtered through a filter press or other filtering device such as a centrifuge where the pigment solids are separated and a press-cake or pulp is formed. Whereas the original slurry normally contains from 3 to 6% by weight of the solids, the press-cake contains from 20 to 50% by weight of the pigment solids. The press-cake is washed with water in order to remove soluble impurities (the cake is then sometimes blown with air in the filter) and the press-cake is removed from the filter for future processing.

The separation process carried out by various methods of filtration often involves undesired compaction of the pigment particles.

The initial aqueous suspension of pigment can be formed in various ways such as: (a) by precipitating a dye (a lake pigment) with the salt of a metal (barium chloride, calcium chloride, lead nitrate, etc.), (b) by forming an insoluble pigment from a diazo coupling reaction, (c) by the absorption of a dye on an inorganic hydrate (such as aluminium hydrate), or (d) by aqueous dilution of a dispersed or solvated pigment (for example phthalocyanine blue).

Proceeding from the press-cake or pulp stage, dry and flushed colour processing go their separate ways. If dry colour is desired, the press-cake is dried and pulverized. These later stages may give rise to environmental problems caused by the dusting of the dry pigment.

In the know process, in order to flush the pigment the press-cake is transferred to the flushing equipment. The non-aqueous medium is added in a predetermined amount, and the mixing process is performed. When the non-aqueous medium replaces most of the water, the phases separate, and the aqueous phase is removed and discarded. The flushing process often has to be repeated in order to form a "dense" flushed mass, i.e. a mass with a sufficiently high concentration of pigment in the non-aqueous medium.

A low water content in the flushed mass can be achieved by a vacuum treatment.

GB PS No. 1,342,746 (to ICI) describes dispersions of inorganic pigments of lakes or toners in organic liquids which contain dissolved therein one or more polyesters or a salt thereof derived from a hydroxycarboxylic acid of the formula:

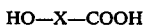

wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

GB PS No. 1,373,660 (to ICI) describes similar dispersing agents, i.e. of the formula YCOZR wherein Z is a divalent bridging group connected to the carbonyl group via an oxygen or nitrogen atom, R is a primary, secondary or tertiary amino group or a salt thereof with an acid or a quaternary ammonium salt group, and Y is the residue of a polyester chain which together with the group —CO— is derived from a hydroxycarboxylic acid of the formula

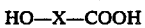

wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

In the cited documents there is no mentioning of flushing carried out on the aqueous phase per se in which the pigment is synthesized. When flushing has been performed hitherto it has been carried out on pastes, press-cakes or "pulps", i.e. on mixtures of pigments and aqueous phases in which the amount of pigment is much larger than is the case in the present invention.

DETAILED DESCRIPTION OF THE INVENTION

According to the present invention an organic pigment dispersion in a non-aqueous medium is prepared by mixing the aqueous slurry containing 0.1–20% by weight of the pigment and the non-aqueous medium in the presence of a dispersing agent under vigorous agitation. Thereafter, the organic pigment dispersion is isolated from the residual aqueous phase. By the process according to the invention it is possible to start directly from the aqueous slurry in which the pigment is formed, i.e. without initial filtration.

The resulting organic pigment dispersion may have a content of water of up to 50% by weight, especially up to 35% by weight, more especially up to 25% by weight, preferably up to 20% by weight and more preferably not more than 15% by weight. After the isolation, the organic pigment dispersion may be subjected to a further process stage in which a substantive proportion of the water contained in the organic pigment dispersion is removed.

Water may be removed from the resulting pigment dispersion for the preparation of pigment concentrates to be used in the ink and paint industries. A pigment concentrate with a high content of pigment is advantageous in that it is simply mixed with other ink or paint ingredients such as binder, thickeners, etc., by the user. In the concentrate, the pigment is still a dispersion in the non-aqueous medium.

It might be possible, however, to use a pigment dispersion comprising at the most 50% of water directly in the preparation of inks and paints. Normally, it is preferred that the water content in the pigment dispersion is less than 35% by weight, especially less than 25% by weight, more especially less than 20% by weight and preferably less than 15% by weight.

In order to obtain the best possible pigmentation of the ink it is desirable to achieve a product with maximum pigment concentration, without additional auxiliary agents which would limit the end use, and with wide-range compatibility so that a single product can be used in a variety of systems, e.g. within the fields of the manufacture of paints based on water-emulsion latex, paints based on varnishes etc., and within the printing ink industry.

When the pigment dispersions with or without a content of water are to be used in ink and paint industries, they are formulated with oily components and optionally auxilliary agents such as further dispersing agents and solvents, binders, etc. in a manner known per se. The final formulation is normally performed by the end user who simply blends the pigment dispersion prepared according to the invention with the other ingredients, normally in a mixing apparatus or on a series of rollers. The amount of pigment dispersion used depends on the final application but is normally adjusted in such a manner that the pigment solids constitute 10–25%, especially 12–15% by weight of the final formulation ready to be used in printing industries.

The process according to the invention is a flushing process, i.e. a process in which a solid is transferred from a slurry or dispersion in a first medium into a second medium. Such a process is possible when the solid in question has more affinity for the second medium than for the first medium.

In the process according to the invention, the "first phase" is water, optionally comprising auxiliary agents, and the "second phase" is the non-aqueous phase, optionally comprising auxiliary agents.

Normally, the organic pigment constitutes 0.5 to 15% by weight and especially 1 to 10% by weight, and more especially 2–5% by weight, of the aqueous slurry.

In the process according to the invention the organic pigment is selected from the group consisting of azo pigments such as diarylides and lake pigments, phthalocyanines, and other condensation pigments.

The ratio between the non-aqueous and the aqueous phase is from 1:20 to 1:200, preferably from 1:30 to 1:150, especially from 1:40 to 1:100, based on parts by weight.

It is a surprising feature that a small amount of non-aqueous medium compared to the amount of water is capable of collecting the pigment particles which appear in a very small amount in the aqueous phase. This is possible when the pigment is hydrophobic.

As the non-aqueous medium to be used in the preparation of the organic pigment dispersion any organic medium normally used in the preparation of organic printing inks and paints may be mentioned.

The organic medium is preferably an organic solvent of low polarity, such as hydrocarbons.

The organic medium may also consist of one or more organic solvents selected from the group consisting of liquids having a boiling point of at least 80° C. and in which the pigment is substantially insoluble.

A preferred organic medium comprises one or more solvents selected from the group consisting of aromatic and aliphatic optionally halogenated hydrocarbons, esters, alcohols, ketones, and ethers, and an especially preferred medium comprises mineral oils with boiling points of above 200° C.

Elevated temperatures, i.e. temperatures above 20° C., facilitate the transfer of the pigment from the aqueous to the non-aqueous phase. Normally, it is not preferred to heat the mixture of aqueous and non-aqueous media to a temperature above 95° C. Hence, the flushing process according to the invention may be performed at a temperature of 30°–95° C., especially at 50°–90° C.

The dispersing agents used in the flushing process must be compatible with the non-aqueous medium in which the pigment is dispersed for the final application. Dispersing agents enhance the phase transfer of the pigment from the aqueous to the non-aqueous medium. Hence, the organic medium preferably contains one or more dispersing agents.

Dispersing agents to be used in the process according to the invention can be added to the pigment formed in the aqueous slurry or to the non-aqeous medium with which the pigment is flushed, or two or more dispersing agents can be used of which one or more may be added to the aqueous slurry before the addition of non-aqueous medium, to which optionally one or more dispersing agent(s) is/are added.

Dispersions of increased fluidity are obtained when the dispersing agent components are selected from the group consisting of resins, alkyds and dispersants with a molecular structure which enables them to lock onto a selected pigment surface and furthermore contain a solventsoluble chain, so-called hyperdispersants.

Especially preferred dispersants are derivatives of a polyester derived from a hydroxy carboxylic acid of the formula HO—X—COOH wherein X is a divalent saturated or unsaturated radical containing at least 8 carbon atoms and in which there are at least 4 carbon atoms between the hydroxy and the carboxylic acid groups, or from a mixture of such a hydroxy carboxylic acid and a carboxylic acid which is free from hydroxy groups. A derivative of a polyester may be the reaction product of an amine and the polyester, i.e. compounds containing an amide group. Advantageous derivatives of the above-mentioned esters are amides and salts of the polyesters. Other usable dispersants are mixed amide/salt-derivatives of polyesters.

In order to bind at least one of the components of the dispersing agent mixture or of the hyperdispersants to the pigment particles it is advantageous to use a synergist as a linking agent. A synergist may be defined as a compound which is capable of binding to the pigment particles at least one of the components in the dispersing agent mixture. Especially preferred types of synergists are derivatives of the pigment. The synergist may constitute a part of the dispersing agent mixture. The use of dispersants linked to the pigment particle surface counteract an undesired flocculation of the pigment particles so that a later milling of the pigment paste, if necessary, is facilitated, and the final modification with e.g. varnish for the preparation of the ink ready for use is made easier and the rheological properties of the ink are improved.

In the preparation of most of the organic pigments, and especially in the preparation of yellow and red pigments, it is advantageous to add resins and/or rosins to the aqueous reaction medium. In this way the pigment particles may be coated with the resin/rosin. The coating may be performed by precipitating the resin/rosin on the pigment particles in the aqueous slurry. Such a coating will assist in preventing the agglomeration of the pigment particles. The precipitation may be performed in various manners, depending on the chemical nature of the resin/rosin. One precipitation method involves addition of an acid and another method involves the addition of a calcium ion containing compound which causes the formation of a calcium salt of the resin/rosin.

Suitable resins/rosins to be used in the preparation of pigments are wood rosins, hydrogenated wood rosins, esters thereof, hydrocarbon resins and mixtures thereof.

The contents of resin, i.e. one or more resins/rosins, hereinafter called "resin", may be of the same order of magnitude as the contents of pigment which means that the resin may constitute up to 50% by weight of the dry matter in the end product pigment dispersion.

The isolation of the organic pigment dispersion from the aqueous phase is normally carried out by filtration, optionally by suction.

After isolation from the aqueous phase the resulting organic pigment dispersion comprises pigment and optionally resin in an amount of 30–85% by weight, the remaining constituents being the non-aqueous flushing medium and optionally dispersing agents and at the most 50% by weight of water. The weight ratio between pigment (optionally comprising resin) and non-aqueous medium lies preferably between 30:70 and 85:15, especially between 40:60 and 60:40.

The dispersing agent component is normally used in relatively large amounts, i.e. up to an amount of 30%, preferably up to 20%, by weight based on the pigment (optionally including resin).

The organic pigment dispersion may be used per se in many fields of application. The major consumption of flushed pigments takes place in the paint and printing ink industries, where the pigments are mixed with solvents, binders and other additives (auxiliaries), e.g. as described in the Examples.

The amount of water tolerated in the end product depends on the end use. If the pigment dispersion produced is to be used in a form in which water is undesired, it is necessary to subject the pigment dispersion to a process stage in which a substantial proportion of the water contained in the organic pigment dispersion is removed. In the known art, water is removed from the flushed pigment by means of vacuum or by drying in an oven.

It has now been found that it is possible to remove the water from the pigment dispersion by contacting the dispersion with a surface with less affinity for water than for the non-aqueous medium. This contacting operation will cause the aqueous and the non-aqueous phases to separate as the non-aqueous phase will tend to adhere more strongly to the surface than the aqueous phase. In a preferred embodiment of this removal of water, the dispersion is contacted with a series of surfaces with different affinity for water and the non-aqueous medium with the organic pigment dispersed therein, respectively. The two phases will then adhere to the respective surfaces and can be removed therefrom, e.g. by means of a scraping device. Advantageously, the series of surfaces is a series of rollers, the surface thereof having different affinity for water and the non-aqueous medium, respectively. In this embodiment, the organic pigment dispersion is passed over a series of rollers as shown in the drawing.

As examples of surfaces with different affinity for water and the non-aqueous medium may be mentioned stainless steel and copper, respectively, and exposed and non-exposed off-set plates, respectively. When the pigment dispersion is passed over a series of two or more rollers, one or more made of copper and one or more made of stainless steel, water will adhere to the steel surface and can be removed therefrom, e.g. by means of a scraper, and the non-aqueous phase will adhere to the copper surface and can be removed therefrom. The same may apply to a series of surfaces made from exposed and non-exposed off-set plates.

The removal of a substantial part of the water contained in the organic pigment dispersion can also be performed by passing the pigment dispersion through a nozzle under release of pressure.

This aspect of the invention will now be further described with reference to the drawing, which diagramatically illustrates an embodiment of the apparatus according to the invention.

The apparatus shown comprises a pair of co-operating rollers comprising a first roller 10 having an outer peripheral surface 11 and a second roller 12 having an outer peripheral surface 13. The peripheral surfaces 11 and 13 of the rollers are complementarily shaped so that these surfaces may be maintained in a closely spaced relationship when the rollers are rotated about their respective axis, so as to form a nip 14 between the rollers. In the preferred embodiment the axis of the rollers 10 and 12 are substantially parallel and the peripheral surfaces 11 and 13 of the rollers each defines a circular cylindrical surface. However, each of the peripheral surfaces 11 and 13 may define a surface of revolution of any other type, provided that the surfaces of revolution of the co-operating peripheral surfaces 11 and 13 are complementary. Alternatively, the axis of the rollers may define an acute angle therebetween, and each of the peripheral surfaces 11 and 13 may then have a conical shape or be shaped as any other surface of revolution.

The rollers 10 and 12 may be driven in opposite directions as indicated by arrows 15 and 16 by conventional driving means (not shown) which may comprise gear, belt and/or chain drives. The driving means are adapted to drive the rollers 10 and 12. The rollers may be driven at the same or at different peripheral speeds. The peripheral surfaces 11 and 13 of the rollers 10 and 12 are made from different materials or different surface characteristics have been imparted to these two surfaces in other manner as described in greater detail below.

The apparatus described above may be used for separating a component 17, such as water, from a viscous material or composition 18 including such component. The viscous material, which may, for example, be a mass of colour pigment containing oil and water, may be supplied to the upper side of the nip 14 defined between the rollers 10 and 12 while the rollers are rotating in the direction indicated by the arrows 15 and 16. The viscous material or mass 18 will then be flattened out into a thin layer which is brought into intimate contact with the roller surfaces 11 and 13.

As mentioned above, the surface characteristic of the peripheral surface 11 is different from that of the peripheral surface 13. As an example, the peripheral surface 11 of the roller 10 may be made from steel, while the peripheral surface 13 of the roller 12 is made from copper. In that case, the water component of the viscous mass 18 tends to adhere to the steel surface 11 rather than to the copper surface 13, while the oil containing pigment material tends to adhere to the copper surface 13 rather than to the steel surface 11. The water layer 19 adhering to the roller surface 11 may be removed from the latter by means of a stationary scraper or doctor blade 20 engaging with the roller surface 11. The layer 21 of pigment material 22 may correspondingly be removed from the roller surface 13 by means of a stationary scraper or doctor blade 23 engaging with the roller surface 13.

It will be understood that by means of the apparatus described above a component such as water or another liquid may be separated from a viscous mass, which may be continuously or intermittently supplied to the upper part of the roller nip.

The invention will now be illustrated in the following non-limiting Examples in which the term "mineral oil" designates a high-boiling petroleum fraction, boiling range 250°–290° C., normally named HBPF.

EXAMPLE 1

Preparation of pigment yellow 13

A. 52.4 g of 3,3'-dichlorobenzidine bishydrochloride was slurried in 80 ml of water and 73.5 ml of 30% hydrochloric acid at 0° C. with stirring for two hours. While keeping the temperature at 0° C., 400 ml of water and 22.5 g of sodium nitrite were added, stirring being continued for half an hour. The surplus of nitrous acid was removed by means of sulfamic acid, and water was added to a volume of 1200 ml. The solution was then filtered twice to remove impurities.

B. The filtrate of step A was added during 2 hours at pH 4 and 20° C. to a slurry of 66.6 g of acetoacet-2,4-dimethylanilide in a mixture of 1500 ml of water, 41 g of 30% hydrochloric acid and 19.2 g of glacial acetic acid. The resulting slurry of pigment yellow 13 was heated to 80° C.

This slurry contained 96 g of pigment in 4.0 l of water. (=2.4% by weight of pigment).

C. The slurry as produced in step B was filtered, the filter-cake was washed thoroughly with water and dried whereafter the dry press-cake was pulverized.

EXAMPLE 2

Preparation of a slurry of pigment yellow 13 with a rosin

A tetrazo solution as produced in step A of Example 1 was added during 2 hours at pH 4 and 20° C. to a slurry of 66.6 g of acetoacet-2,4-dimethylanilide in a mixture of 1500 ml of water, 41 g of 30% hydrochloric acid and 19,2 g of glacial acetic acid. The resulting pigment slurry was heated to 80° C., 40 g of 28% sodium hydroxide solution was added and finally a solution of 57.3 g of hydrogenated wood rosin in a mixture of 32.9 g of 28% sodium hydroxide and 480 ml of water was added. After being left overnight at 80°–90° C. the pigment slurry was acidified to pH 5.5.

This slurry contained 149.1 g of pigment (inclusive of wood rosin) in 5.8 l of water (=2.57% by weight of pigment including resin).

EXAMPLE 3

Flushing of a slurry of pigment yellow 13 without a resin and subsequent drying thereof To 3.58 l of the aqueous slurry of Example 1, step B, containing 86 g of the pigment was added 57.3 g of mineral oil while stirring with a high speed stirrer at 50°–60° C.

The water separated from the pigment-oil dispersion within 1.5 min. and was then filtered on a Büchner funnel. Hot air was blown through the product to remove excess surface water. The product contained 69% by weight of water.

The water-containing product was dried in an oven at 65° C. until a granulate containing 60% by weight of pigment yellow 13 and 40% by weight of oil was formed.

EXAMPLE 4

Flushing of a slurry of pigment yellow 13 comprising a dispersing agent

To 3.58 l of the aqueous slurry of Example 1, step B, containing 86 g of the pigment and 288 ml of an aqueous suspension containing 6.9 g of Solsperse TM 22000, 6.9 g Solsperse TM 17000 and 7.7 g of mineral oil was added 35.8 g of mineral oil, i.e. in total 42.7 g of mineral oil, while stirring with a high speed stirrer at 50°–60° C.

Within 12 min. the pigment-oil dispersion separated from the water and was then filtered on a Büchner funnel. Hot air was blown through the dispersion to remove excess of surface water. The product contained 15% by weight of water.

EXAMPLE 5

Preparation of a concentrate of pigment yellow 13

The water-containing dispersion as produced in Example 4 was dried in an oven at 65° C. to form an granulate containing 60% by weight of pigment yellow 13 and 40% by weight of oil.

EXAMPLE 6

Flushing of a slurry of pigment yellow 13 comprising wood rosin as dispersing agent and separating water on rollers A. To 3.35 l of the aqueous slurry of Example 2 containing 86 g of the pigment (inclusive of wood rosin) was added 57.3 g of mineral oil while stirring with a high speed stirrer at 50°–60° C.

Within 2 min. the pigment-oil dispersion separated from the water and was then filtered on a Büchner funnel. Hot air was blown through the dispersion to remove excess of surface water. The product contained 9% by weight of water.

B. The pigment product from step A was transferred to a two roller mill, one of the rollers made of steel the other made of copper. As the organic phase has more affinity for the copper surface and water has more affinity for the steel surface, the two phases separated.

The resulting pigment concentrate was non-aqueous and contained 60% by weight of pigment yellow 13 and 40% by weight of oil.

EXAMPLE 7

Flushing of a slurry of pigment yellow 13 comprising dispersing agents

A. To 3.35 l of the the aqueous slurry of Example 2 containing 86 g of the pigment (and wood rosin) and 288 ml of an aqueous slurry containing 6.9 g of Solsperse TM 22000, 6.9 g of Solsperse TM 17000 and 7.7 g of mineral oil was added 35.8 g of mineral oil while stirring with a high speed stirrer at 50°-60° C.

Within 1.5 min. the pigment-oil dispersion separated from the water and was then filtered on a Büchner funnel. Hot air was blown through the concentrate to remove excess of surface water. This product contained 17% by weight of water.

B. To 3.35 l of the aqueous slurry of Example 2 containing 86 g og the pigment (and wood rosin) was added 350 ml of an aqueous slurry containing 6.9 g of Solsperse TM 22000, 6.9 g Solsperse TM 17000 and 1.4 g of mineral oil while stirring with a high speed stirrer at 50°-60° C.

Within 2 min. the pigment-oil dispersion separated from the water and was then filtered on a Büchner funnel. Hot air was blown through the concentrate to remove excess of surface water.

The water-containing product was dried in an oven at 65° C. until a granulate containing 85% by weight of pigment yellow 13 and 15% by weigh of oil (including Solsperses) was formed.

C. To 3.35 l of the aqueous slurry of Example 2 containing 86 g of the pigment (and wood rosin) and 288 ml of an aqueous slurry containing 6.9 g of Solsperse TM 22000, 6.9 g Solsperse TM 17000 and 7.7 g of mineral oil was added 179.2 g of mineral oil while stirring with a high speed stirrer at 50°-60° C.

Within a few minutes the pigment-oil dispersion separated from the water and was then filtered on a Büchner funnel. Hot air was blown through the dispersion to remove excess of surface water.

The water-containing product was dried in an oven at 65° C. until a granulate containing 30% by weight of pigment yellow 13 and 70% by weight of oil (including Solsperses) was formed.

EXAMPLE 8

Separation of water from a pigment concentrate on rollers

The pigment product from Example 4 was transferred to a two roller mill, one of the rollers made of steel the other one made of copper whereby the pigment concentrate was separated from residual water.

The resulting pigment concentrate was non-aqueous and contained 60% by weight of pigment yellow 13 and 40% by weight of oil.

EXAMPLE 9

Separation of water from a pigment concentrate on rollers

The pigment dispersion as produced in Example 7 was transferred to a two roller mill, one of the rollers made of steel, the other made of copper whereby the pigment concentrate was separated from residual water.

The resulting non-aqueous pigment concentrate contained 60% by weight of pigment yellow 13 and 40% by weight of oil (including Solsperses).

EXAMPLE 10

Preparation of pigment red 57:1 comprising a rosin

A. To a slurry of 83.6 g of 2-amino-5-methylbenzenesulfonic acid in a mixture of 700 ml of water and 50 ml of 30% hydrochloric acid at 0° C. was added a solution of 31.6 g of sodium nitrite in 80 ml of water during 15 min.

After stirring in 15 min. sulfamic acid was added in order to remove the surplus of nitrous acid.

B. To the slurry of step A was added a solution of 91.0 g of 3-hydroxy-2-naphthoic acid in 50 ml of 28% sodium hydroxide and 1 l of water during 20 min. at 2°-3° C. The red pigment slurry was then stirred for 1 hour, 42 g of hydrogenated wood rosin in a mixture of 17 ml of 28% sodium hydroxide and 520 ml of water was added. After stirring for half an hour a solution of 105 g of calcium chloride in 500 ml of water was added and the pigment slurry was heated to 60° C. and stirred for 1 hour.

This pigment slurry contained 227 g in 10 l of water (2.27%).

C. The slurry as produced in step B was filtered, the filter-cake was washed thoroughly with water and dried whereafter the dry press-cake was pulverized.

D. To the slurry as produced in step B heated to 80°-90° C. was added 151.3 g of mineral oil under vigorous stirring. The pigment-oil dispersion separated slowly from the water and was filtered off, washed thoroughly with water and dried until a concentrate in granular form containing 60% by weight of pigment red 57:1 (inclusive of wood rosin) and 40% by weight of oil was formed.

EXAMPLE 11

Flushing of a slurry of pigment red 57:1

To the slurry as produced in Example 10, step B, heated to 80°-90° C. was added 22.7 g of Hypersol ®4704 in 128.6 g of mineral oil under vigorous stirring. The pigment-oil dispersion separated within 15 min. from the water and was filtered off, washed thoroughly with water and dried in an oven at 65°-85° C. to form a granulate containing 60% by weight of pigment red 57:1 (inclusive of wood rosin) and 40% mineral oil (inclusive of Hypersol ®4704).

EXAMPLE 12

Flushing of a slurry of pigment blue 15:3 and subsequent drying thereof

A. A slurry of 65 g of copper phthalocyanine in 2 l of water was heated to 80°-90° C. in 2 hours. This slurry contained 3.25% by weight of pigment blue 15:3.

B. The slurry was filtered and washed thoroughly with water and the press-cake was dried.

C. To the slurry as produced in step A heated to 80°–90° C. was added 43.3 g of mineral oil under vigorous stirring. The pigment-oil concentrate separated within a few minutes from the water and was filtered off, washed thoroughly with water and dried in an oven at 65° C. to form a granulate containing 60% by weight of pigment blue 15:3 and 40% by weight of oil.

EXAMPLE 13

Flushing of a slurry of pigment blue 15:3 and subsequent water separation on rollers A. To a slurry of 4.2 g of Solsperse TM 5000 in 1.2 l of water at 80° C. was added a slurry of 65 g of copper phthalocyanine in 2 l of water. 4.6 g of Solsperse TM 17000 in 100 ml of water was added while stirring and the stirring was continued for 45 min.

This slurry contained 73.8 g by weight of pigment blue 15:3 (comprising Solperse TM 5000 and Solperse TM 17000) in 3.3 l of water (=2.2% by weight of pigment).

B. To the slurry as produced in step A heated to 80°–90° C. was added 49.2 g of mineral oil under vigorous stirring. The pigment-oil concentrate separated within a few minutes from the water and was filtered off and washed thoroughly with water and dried to form a granulate containing 60% by weight of pigment blue 15:3 (inclusive of dispersing agents) and 40% by weight of oil.

C. To the slurry as produced in step A heated to 80°–90° C. was added 49.2 g of mineral oil under vigorous stirring. The pigment-oil dispersion separated within a few minutes from the water and was filtered off, washed thoroughly with water. The pigment dispersion contained 35% by weight of water.

The pigment dispersion was then transferred to a two roller mill, one of the rollers made of steel the other of copper whereby the pigment concentrate was separated from residual water.

The resulting pigment concentrate contained 60% by weight of pigment blue 15:3 (inclusive of dispersing agents) and 40% by weight of oil.

EXAMPLE 14

Comparison between the products prepared according to Examples 3, 5, 6B, 7A, 7B, 7C, 8, 9, 10D, 11, 12C, 13B and 13C For the production of offset printing inks 22.3 g of concentrate as produced according to Examples 3, 5, 6B, 7A, 8, 9, 10D, 11, 12C, 13 and 13C, respectively, were each stirred with 66.8 g of offset quick-set varnish and 10.9 g of mineral oil with a high speed stirrer.

For the production of offset printing ink 15.7 g of concentrate as produced according to Example 7B was stirred with 66.8 g of offset quick-set varnish and 17.5 g of mineral oil with a high speed stirrer.

For the production of offset printing ink 44.4 g of concentrate as produced according to Example 7C was stirred with 55.6 g of offset quick-set varnish with a high speed stirrer.

Inks prepared from paste as prepared according to Example 12C show the same development of colour strength as base pigment in Example 12B while concentrates according to Example 13B and 13C give higher colour strength, but 12C, 13B and 13C need only one pass with light pressure on the three roller mill.

What is claimed is:

1. A process for the preparation of an organic pigment dispersion in a non-aqueous medium comprising the steps of:
    mixing an aqueous slurry of the organic pigment containing 0.1 to 10% by weight of the pigment, calculated on the slurry, in the presence of a dispersing agent component with the non-aqueous medium under vigorous agitation;
    isolating the organic pigment dispersion comprising up to 50% by weight of water from the residual aqueous phase; and
    removing a substantial proportion of the water contained in the organic pigment dispersion by contacting the dispersion with a surface with less affinity for water than for the non-aqueous medium and separating the aqueous phase from the non-aqueous phase.

2. A process according to claim 1 wherein the resulting organic pigment dispersion, before the contacting with a surface with less affinity for water than for the non-aqueous medium, comprises up to 35% by weight of water.

3. A process according to claim 2 wherein the resulting organic pigment dispersion, before the contacting with a surface with less affinity for water than for the non-aqueous medium, comprises up to 15% by weight of water.

4. A process as claimed in claim 1 wherein the organic pigment constitutes 1 to 10% by weight of the aqueous slurry.

5. A process as claimed in claim 1 wherein the non-aqueous medium is an organic medium as normally used in the preparation of organic printing inks and paints.

6. A process as claimed in claim 5 wherein the organic medium is an organic solvent of low polarity.

7. A process as claimed in claim 5 wherein the organic medium comprises one or more organic solvents selected from the group consisting of liquids having a boiling point of at least 80° C. and in which the pigment is substantially insoluble.

8. A process as claimed in claim 5 wherein the organic medium is selected from the group consisting of aromatic and aliphatic optionally halogenated hydrocarbons, esters, alcohols, ketones, ethers, and mixtures thereof.

9. A process as claimed in claim 1 wherein the dispersing agent component is constituted of one or more agents selected from the group consisting of resins, alkyds and dispersants with a molecular structure which enables them to lock onto a selected pigment surface and furthermore contain a solvent soluble chain, so-called hyperdispersants.

10. A process as claimed in claim 9 wherein the dispersant is a derivative of a polyester derived from a hydroxy carboxylic acid of the formula HO—X—COOH wherein X is a divalent saturated or unsaturated radical containing at least 8 carbon atoms and in which there are at least 4 carbon atoms between the hydroxy and the carboxylic acid groups, or from a mixture of such a hydroxy carboxylic acid and a carboxylic acid which is free from hydroxy groups.

11. A process as claimed in claim 10 wherein the dispersant is an amide or a salt of a polyester.

12. A process as claimed in claim 9 wherein the dispersing agent mixture comprises a synergist capable of binding at least one of the components in the dispersing agent mixture of the pigment particles.

13. A process as claimed in claim 12 wherein the synergist is a derivative of the pigment.

14. A process as claimed in claim 1 wherein the aqueous slurry contains at least one resin in an amount of up to 50% by weight based on dry matter in the organic pigment dispersion.

15. A process as claimed in claim 9 wherein the dispersing agent mixture is present in an amount of up to 30% by weight based on the pigment.

16. A process as claimed in claim 1 wherein the organic pigment is selected from the group consisting of azo pigments such as diarylides and lake pigments, phthalocyanines, and other condensation pigments.

17. A process as claimed in claim 1 wherein the removal of a substantial part of the water is performed by contacting the dispersion with a set of surfaces with different affinity for water and the organic pigment dispersion, respectively, and thereafter isolating water and the organic pigment dispersion separately.

18. A process as claimed in claim 17 wherein the removal of water from the dispersion is performed by passing the dispersion over a set of rollers, the surface material thereof having different affinity for water and the non-aqueous medium, respectively, and then removing water and the pigment dispersion in the non-aqueous medium, respectively, from the surface of each roller.

19. A process as claimed in claim 18 wherein the surface materials of the rollers are copper and steel, respectively.

20. A process as claimed in claim 18 wherein the surface materials of the rollers are exposed and non-exposed off-set plates, respectively.

21. A process as claimed in claim 1, wherein the organic pigment constitutes 2–5% by weight of the aqueous slurry.

22. A process as claimed in claim 1, wherein the organic pigment constitutes 2–10% by weight of the aqueous slurry.

23. A process as claimed in claim 1, in which the aqueous slurry is obtained directly from an aqueous slurry in which the pigment is formed, without initial filtration.

* * * * *